United States Patent [19]

Thissen et al.

[11] 4,284,396

[45] Aug. 18, 1981

[54] APPARATUS FOR VACUUM THERMOFORMING POLYMERIC SHEET MATERIAL

[75] Inventors: Christopher P. Thissen; Jerry J. Ferwerda; Milford J. Tweet; Ronald D. Hatfield, all of Austin, Minn.

[73] Assignee: Walker Process Corporation, Aurora, Ill.

[21] Appl. No.: 168,731

[22] Filed: Jul. 14, 1980

[51] Int. Cl.³ .......................................... B29C 17/04
[52] U.S. Cl. .............................. 425/342.1; 425/343; 425/388; 425/397; 425/DIG. 48
[58] Field of Search ............... 425/388, DIG. 48, 397, 425/342.1, 343

[56] References Cited

U.S. PATENT DOCUMENTS

| | | | |
|---|---|---|---|
| 2,761,490 | 9/1956 | Walton | 425/388 X |
| 2,776,451 | 1/1957 | Chavannes | 425/388 X |
| 2,902,718 | 9/1959 | Martelli et al. | 425/388 X |
| 2,935,828 | 5/1960 | Mabaffy et al. | 425/388 X |
| 3,181,202 | 5/1965 | Martelli | 425/388 X |
| 3,265,265 | 8/1966 | Levi | 425/DIG. 48 |
| 3,314,110 | 4/1967 | Mirsbach | 425/388 |
| 3,562,859 | 2/1971 | McIntyre | 425/388 X |
| 3,632,252 | 1/1972 | Amberg et al. | 425/388 X |
| 3,954,368 | 5/1976 | Kawakami | 425/388 X |

Primary Examiner—J. Howard Flint, Jr.
Attorney, Agent, or Firm—Merriam, Marshall & Bicknell

[57] ABSTRACT

Apparatus for vacuum molding a plurality of three dimensional geometrical shapes in a thermoplastic polymeric sheet having a molding plate, the surface of which has a plurality of three dimensional geometrical shapes, with said molding plate having an enclosing border, a molding face and a non-molding face; a gas orifice extending through the molding plate so that a gas can flow from one face of the molding plate to the other face; a mechanism to move the molding plate along a predetermined path; a mechanism to maintain a thermoplastic polymeric sheet, heated to a plastic condition, adjoining the moving molding plate molding face; a mechanism to releasably seal the heated polymeric sheet to and all around the molding plate border; a vacuum source to remove gas, from between the heated polymeric sheet and the molding face of the molding plate, through the gas orifice whereby exterior pressure can force the heated sheet against the molding face surface; and a mechanism for removing the molded sheet, after it cools to a non-plastic condition, from contact with the moving molding plate face.

10 Claims, 19 Drawing Figures

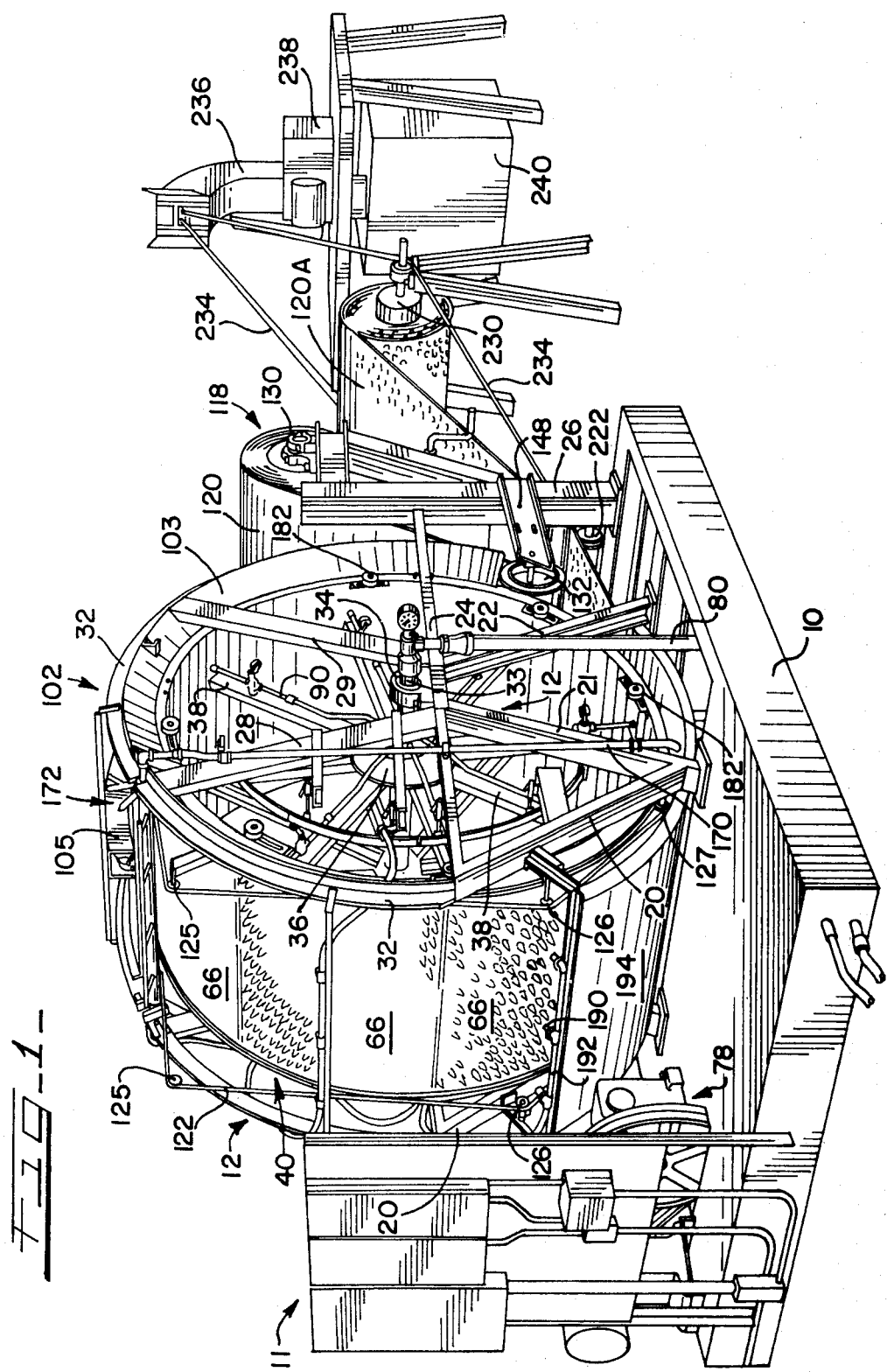

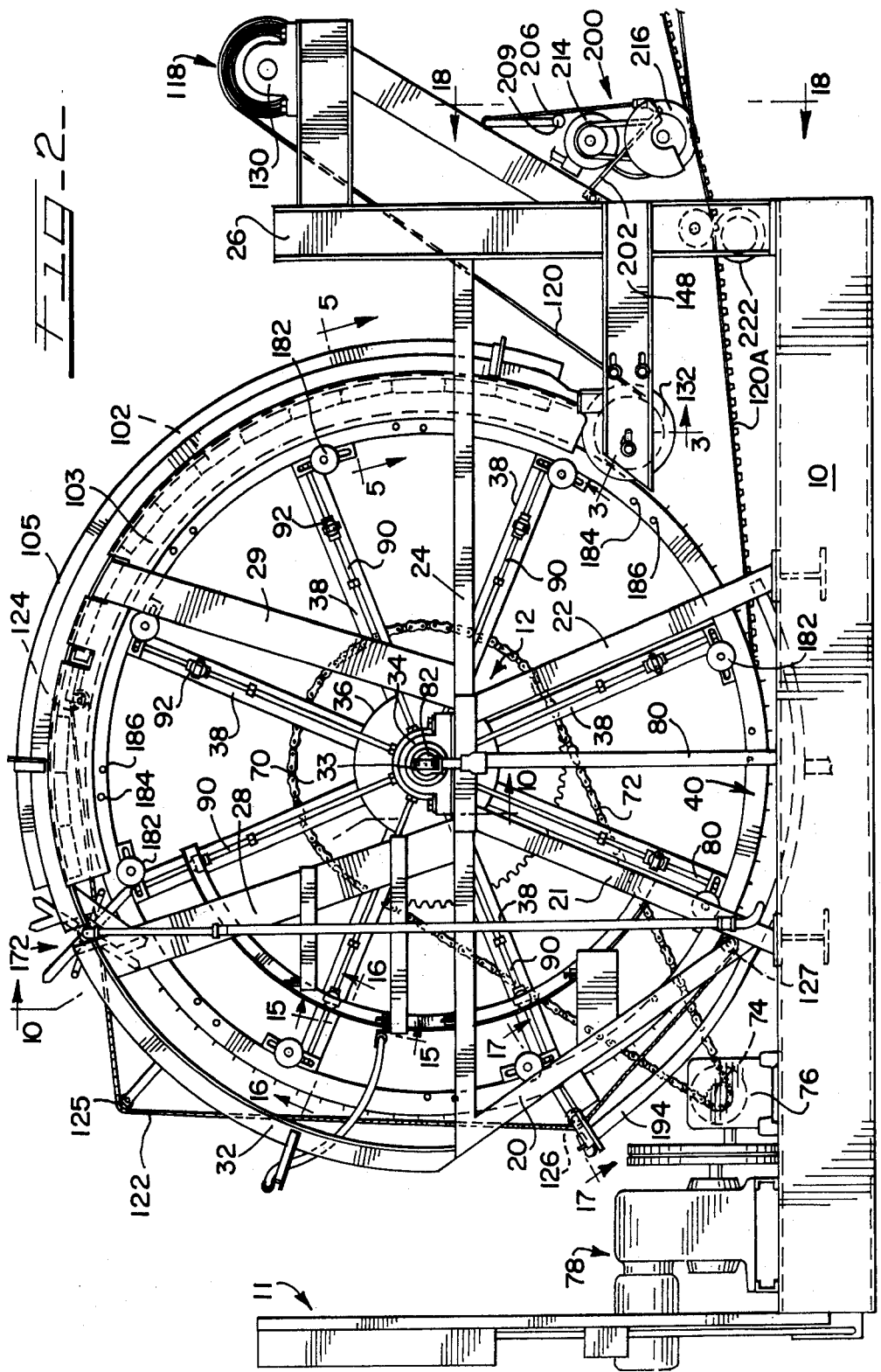

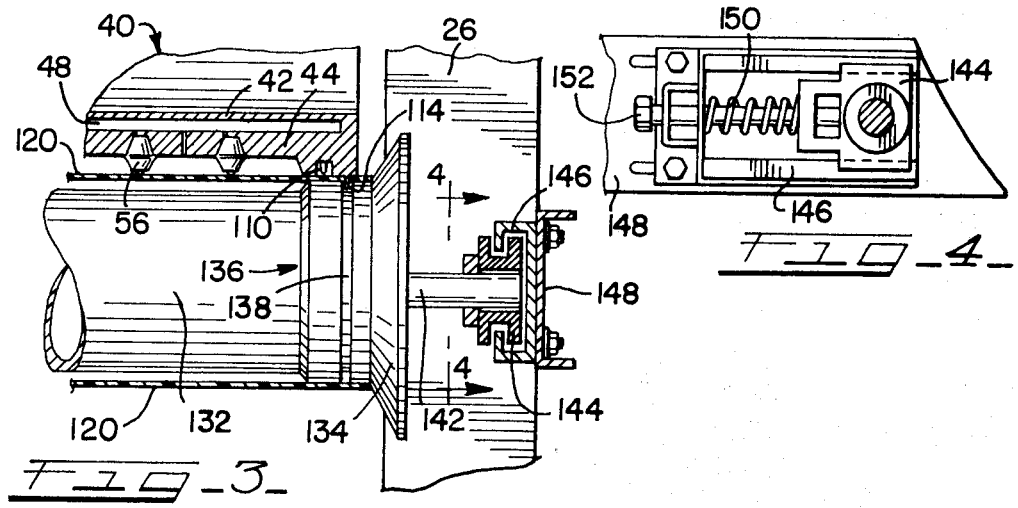
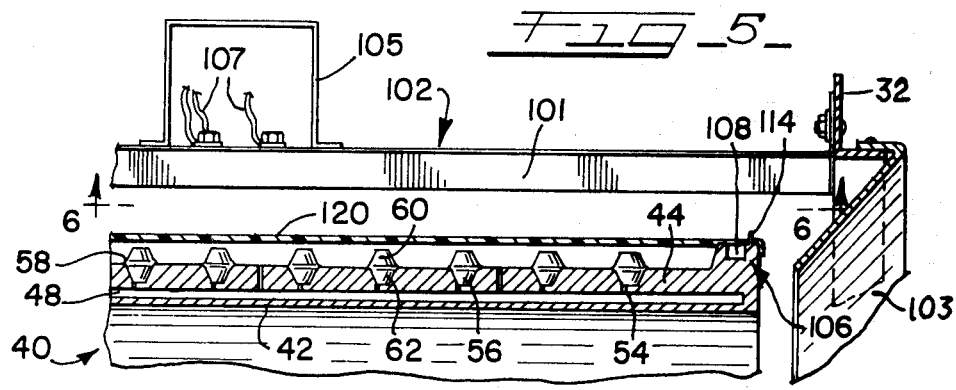
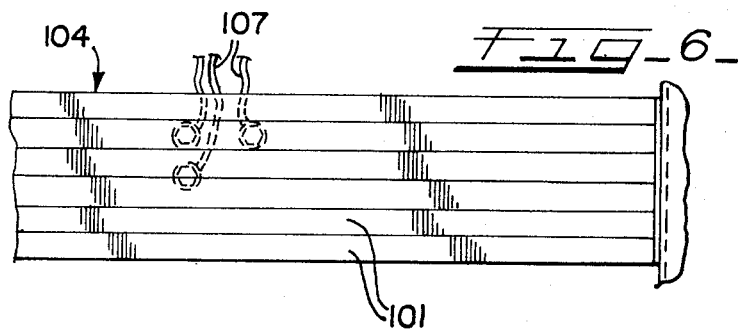

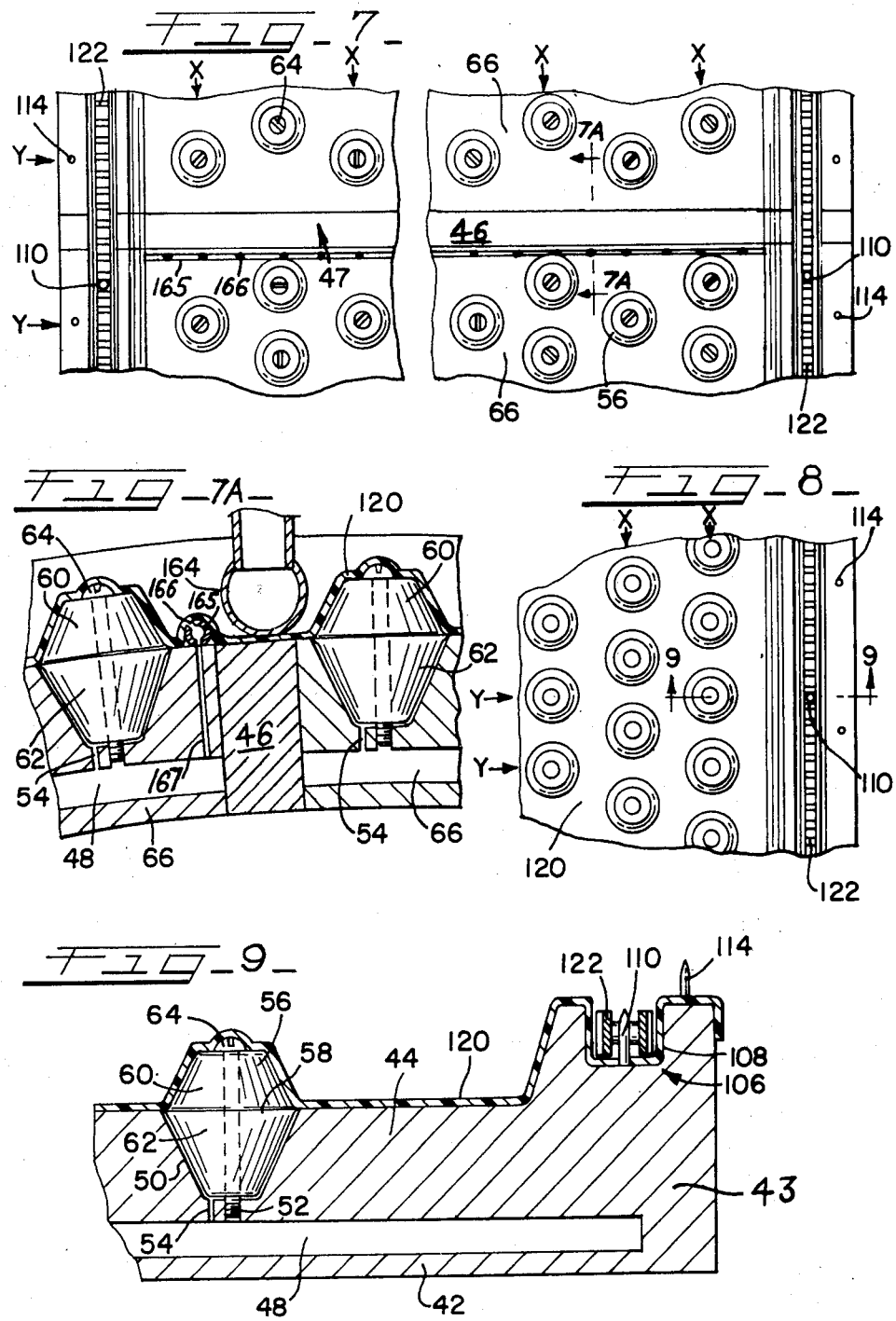

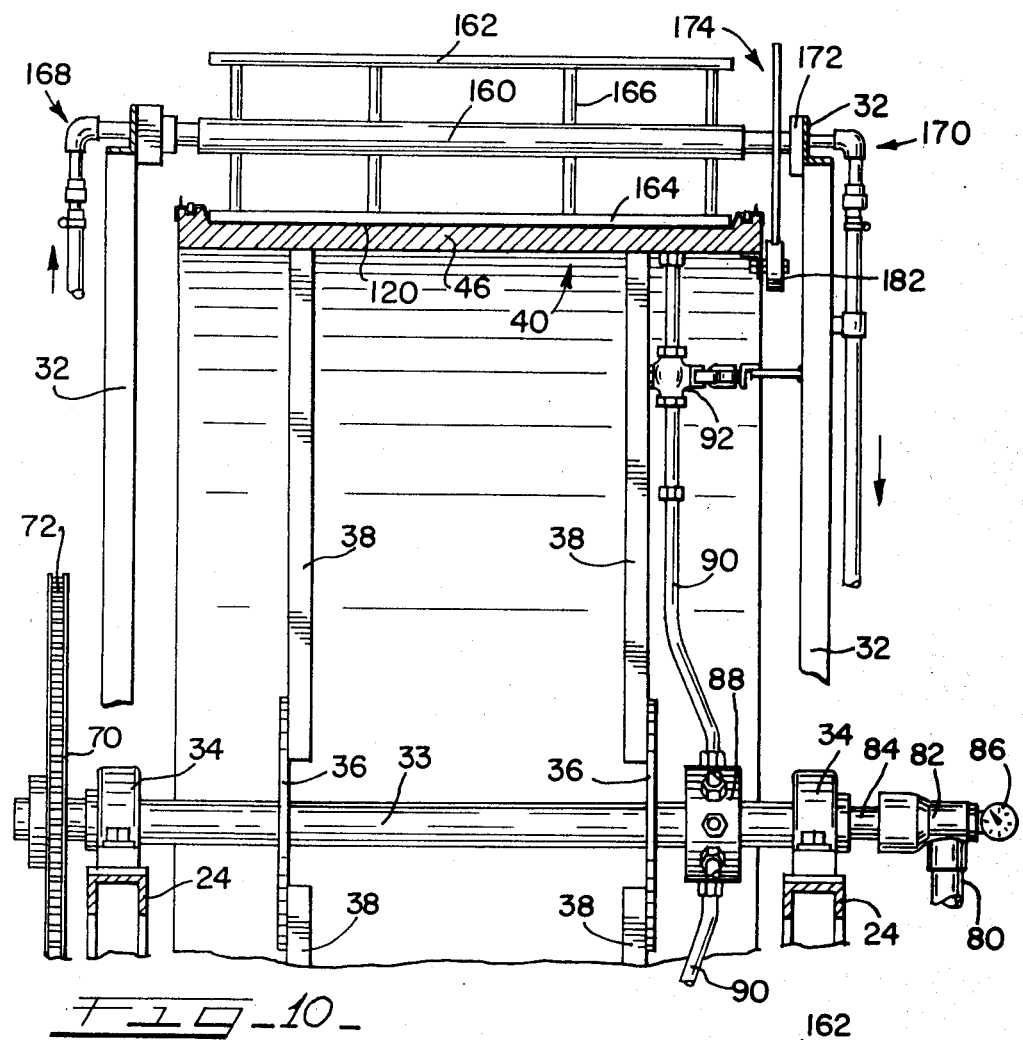
FIG_10
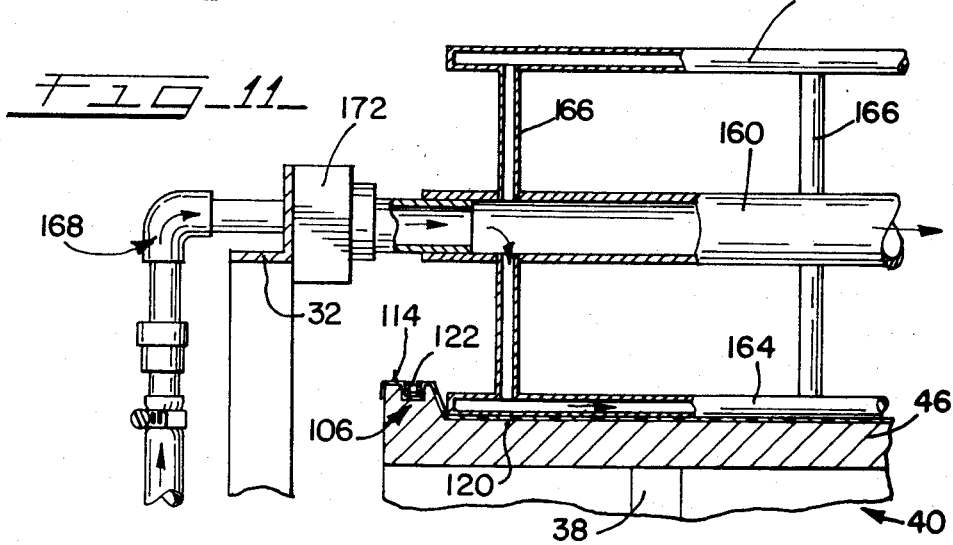
FIG_11

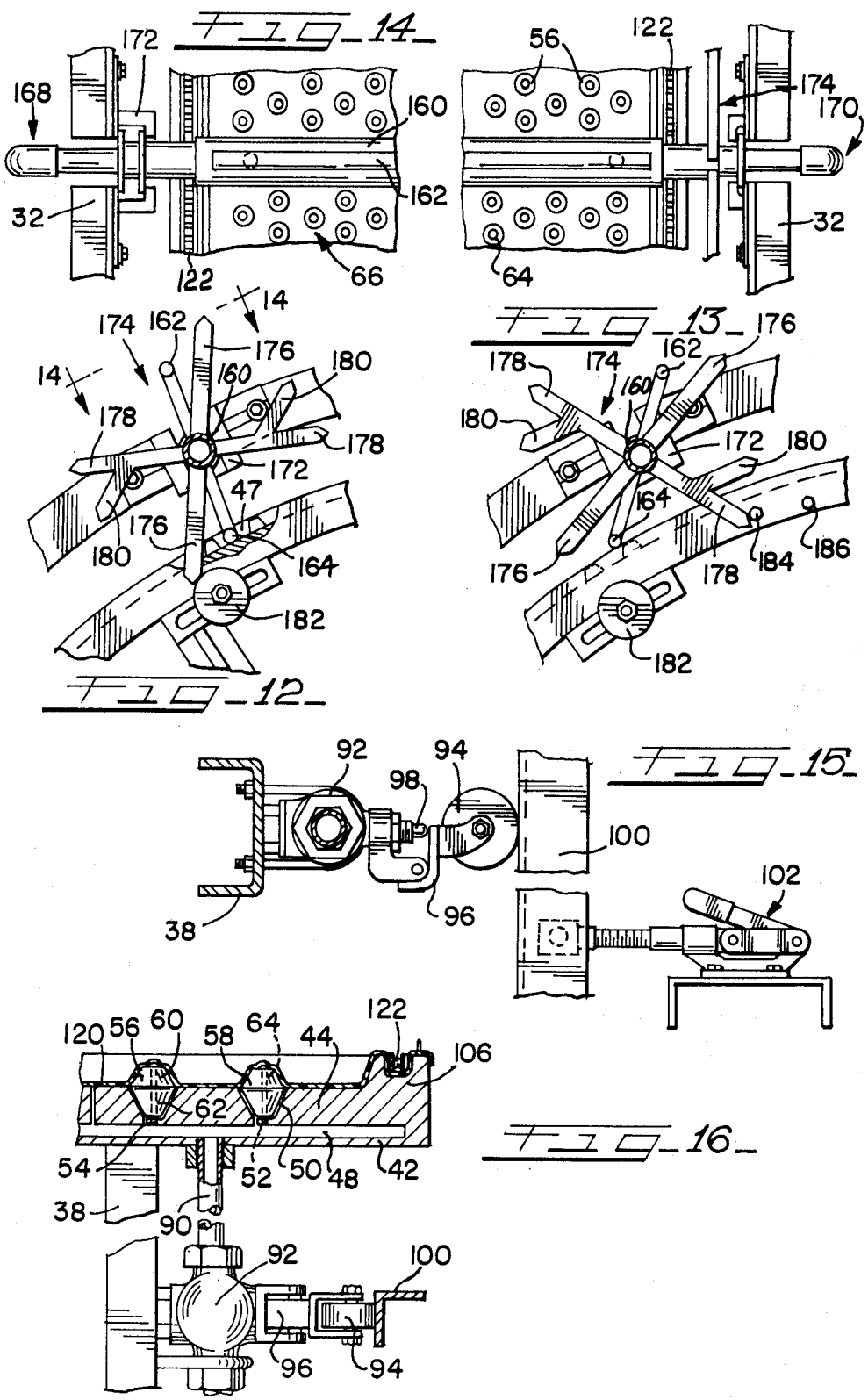

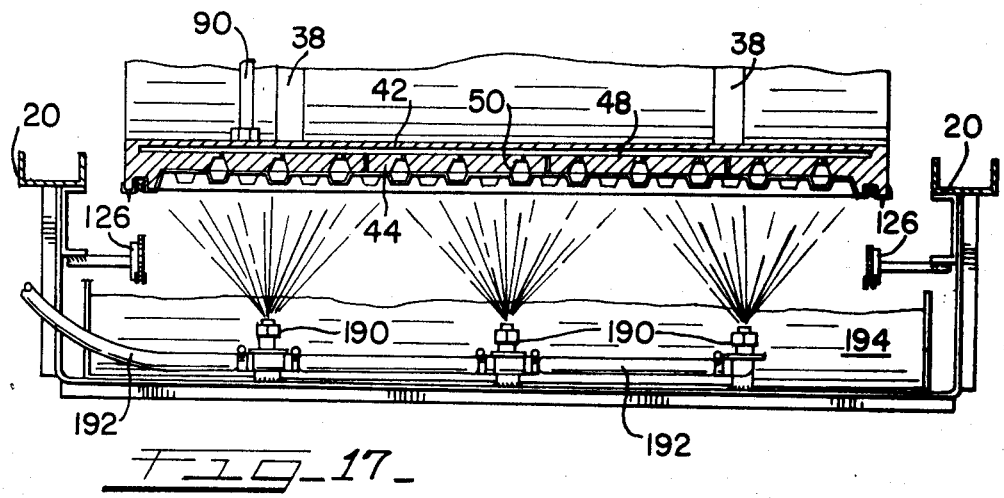
FIG_17_
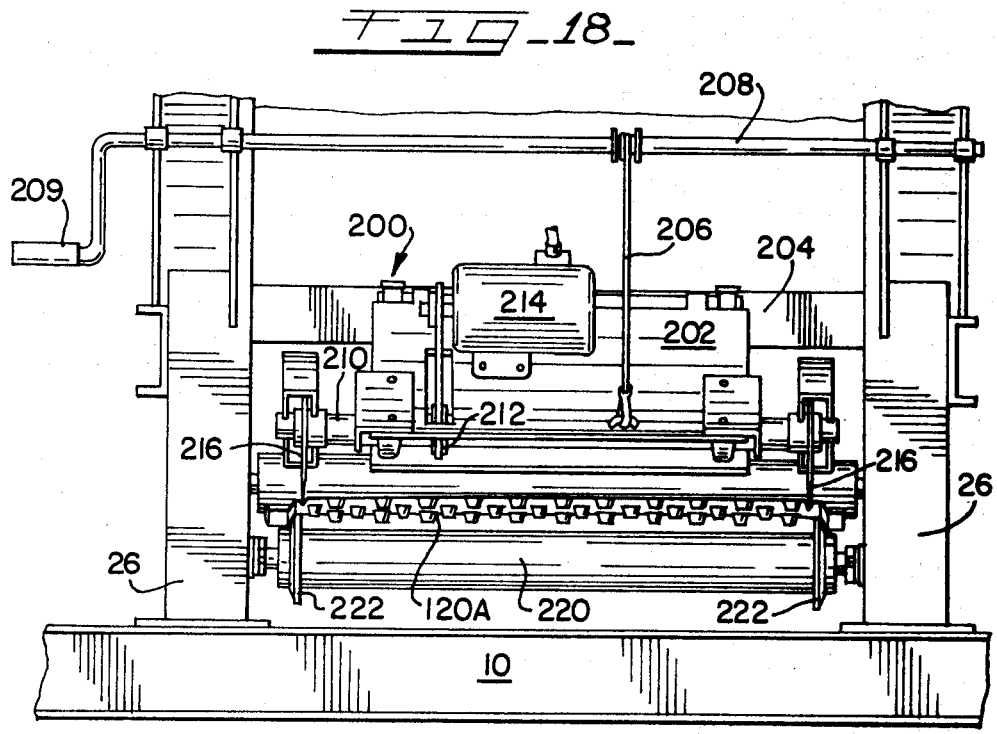
FIG_18_

APPARATUS FOR VACUUM THERMOFORMING POLYMERIC SHEET MATERIAL

This invention relates to vacuum thermoforming polymeric material. More particularly, this invention is concerned with apparatus for and methods of vacuum thermoforming three dimensional shapes in polymeric sheet material, particularly for use in making rotating biological waste water contactors.

BACKGROUND OF THE INVENTION

Various types of rotating biological waste water contactors have been used to expose organisms to air to encourage their growth and thereby increase digestion of organic waste materials in water. Representative of such contactors are those disclosed in U.S. Pat. Nos. 3,827,559; 3,894,953; 3,904,525; 3,997,443; 4,083,746; and 4,115,268.

The rotors of the contactors are generally formed by placing discs side-by-side on a shaft, or by spirally wrapping a strip around a shaft as in U.S. Pat. No. 4,115,268. Various types of spacers are used to keep the discs spaced apart, as well as to maintain the spiral layers apart, and to increase the contact area. The spacers can be separate elements or they can be integrally formed in the discs or spirally wound strip.

The environment in which the rotors are used is highly corrosive. Because of this, the large size of the rotors and the large number of them needed in waste water treatment plants, it is advisable to make them of an inert, tough, and inexpensive material which can be readily shaped and assembled into the rotors. Commercially available polymeric materials such as polyethylene, polypropylene and polystyrene are representative of those which can be used.

Thissen U.S. Pat. Nos. 4,115,268 and 4,083,746 disclose vacuum thermoforming three dimensional geometrical shapes into thermoplastic polymeric sheet material to thereby form integral spacers in the sheet and the subsequent forming of disc rotors and spiral rotors therefrom. The vacuum thermoforming processes disclosed in such prior art operate on a unit basis in which one polymeric sheet is formed on a mold, removed and a new sheet then vacuum thermoformed. Such a procedure has been considered essential because of the necessity to seal the sheet to the mold border to prevent air from entering when air between the sheet and the mold is removed to lower the pressure therein so that atmospheric pressure can press the previously heated and plastic or softened polymeric material into contour contact with the mold surface. The process is similar when a long strip of polymeric sheet material is vacuum thermoformed except that consecutive areas of the strip, rather than separate sheets, are subjected to the described operation. Such processes, involving a start-stop sequence, are inherently slow, limit production, increase costs and require more labor than is desired.

SUMMARY OF THE INVENTION

According to one aspect of the invention, there is provided apparatus for vacuum molding a plurality of three dimensional geometrical shapes in a thermoplastic polymeric sheet, comprising a molding plate, the surface of which has a plurality of three dimensional geometrical shapes, with said molding plate having an enclosing border, a molding face and a non-molding face; at least one gas flow orifice extending through the molding plate so that a gas can flow from one face of the molding plate to the other face; means to move the molding plate along a predetermined path; means maintaining a thermoplastic polymeric sheet, heated to a softened or plastic condition, adjoining the moving molding plate molding face; means to releasably seal the heated polymeric sheet to and all around the molding plate periphery or border; means to remove gas, from between the heated polymeric sheet and the molding face of the molding plate, through the at least one gas flow orifice whereby exterior pressure can force the heated sheet into the shape of the molding face surface; and means for removing the molded sheet, after it cools to a non-plastic condition, from contact with the moving molding plate face.

A vacuum chamber is desirably located on the non-molding face of, and is movable simultaneously with, the molding plate; the at least one orifice is positioned to communicate with the vacuum chamber; and a means is included to remove gas from the vacuum chamber after the polymeric sheet is heated and is thermoformable.

The apparatus can include means to support a roll of polymeric sheet material; and means to continuously feed polymeric sheet material from the roll support means into a position adjoining the moving molding face. Also, a heating means can be included to heat the sheet material to a softened or plastic state before it is sealed to the molding plate periphery or border. Furthermore, means to spray the hot polymeric sheet with a cooling fluid after it is molded is desirably incorporated in the apparatus.

To facilitate removal of the molded sheet, there is advantageously included means to discontinue the vacuum, or the capability of removing gas from between the molding face and the polymeric sheet, before it is removed from the molding plate. Also, the apparatus can include means to coil the removed molded polymeric sheet material in a roll.

A plurality of the molding plates can be arranged end-to-end in a ring as, for example, in the form of a rigid rotatable cylindrical shell. The cylindrical shell can be circular and be rotatably supported by an axle or shaft.

In a more specific embodiment of the invention, there is provided apparatus for continuously vacuum molding a plurality of three dimensional geometrical shapes in a roll of thermoplastic polymeric sheet material comprising a cylindrical shell rotatably mounted on an axle or shaft and means to rotate the cylindrical shell; said cylindrical shell including a plurality of single curved molding plates, the outer molding faces of which have a plurality of three dimensional geometrical shapes; at least one air flow orifice extending through each molding plate so that air can be removed from the molding face of each molding plate; means to continuously feed a length of polymeric sheet material into position adjoining the outer molding faces of the cylindrical shell while it rotates; means to continuously heat moving polymeric sheet material to a thermoforming condition as the cylindrical shell rotates to thereby provide a heated sheet portion adjoining each consecutive molding plate; means to releasably seal the heated polymeric sheet to and all around the border of each consecutive molding plate; means to consecutively remove air, from between the heated polymeric sheet and the molding faces of consecutive molding plates, through the at least one air flow orifice whereby atmospheric pressure can force the heated sheet into the shape of the molding face surface; and means for continuously removing the molded sheet, after it cools to a non-plastic condition, from contact with the moving molding plate molding face.

A separate vacuum chamber can be included on the inside of the cylindrical shell in separate communication with the at least one gas flow orifice of each molding plate together with means to remove gas from consecutive vacuum chambers after the polymeric sheet in contact with consecutive molding plates is heated and made thermoformable.

The sides of the cylinder can be made parallel and each cylindrical shell edge can have a row of spaced-apart radial sharp pointed pins which can penetrate the polymeric sheet material and prevent its edges from pulling inwardly during the heating and vacuum forming operation.

A pair of endless chains is desirably mounted on rollers positioned axial to, and spaced outwardly of, the cylindrical shell, and with one of the chains being positioned opposite a row of spaced apart radial sharp pointed pins, which can penetrate the polymeric sheet material, at each cylindrical shell edge so that a length of the chain follows the cylinder surface contour and engages the pins with a layer of the heated polymeric sheet material therebetween to provide a border seal against air entry along the edges. These pins can be located in a circular groove or trough.

The means to heat the polymeric sheet material can be stationary and spaced outwardly from, but follow the contour of, the cylindrical shell molding plate surfaces.

The apparatus desirably includes bar means to press heated polymeric sheet material against at least the trailing edge of each molding plate in a line axial to the cylindrical shell to thereby seal that portion of the molding plate border against air intake. The bar means can be arranged to move, and be in contact, with the polymeric sheet from before the air is removed from between the molding plate and the polymeric sheet material and until after the thermoforming is completed. However, the bar means is usually arranged to withdraw from contact with the molded sheet material while the air removal means remains activated.

The bar means desirably is supported independently of the cylindrical shell and includes at least one bar connected to, and parallel with, a rotatable shaft which is vertically displaceable. The cylinder is also provided with means to rotate the bar into pressing contact with the heated and softened polymeric sheet.

BRIEF DESCRIPTION OF THE DRAWINGS

FIG. 1 is an isometric overall view of a specific embodiment of the invention;

FIG. 2 is a side elevational view of the main part of the apparatus shown in FIG. 1;

FIG. 3 is a sectional view taken along the line 3—3 of FIG. 2;

FIG. 4 is a sectional view taken along the line 4—4 of FIG. 3;

FIG. 5 is a sectional view taken along the line 5—5 of FIG. 2;

FIG. 6 is a sectional view taken along the line 6—6 of FIG. 5;

FIG. 7 is a plan view of the juncture of two adjoining molding plates;

FIG. 7A is a sectional view taken along the line 7A—7A of FIG. 7;

FIG. 8 is a partial plan view of a molding plate with a polymeric sheet vacuum thermoformed thereon;

FIG. 9 is a sectional view taken along the line 9—9 of FIG. 8;

FIG. 10 is a cross-sectional view taken along the line 10—10 of FIG. 2;

FIG. 11 is an enlarged view, partially broken away, of the lateral sealing bar mechanism shown in FIG. 10;

FIG. 12 is an elevational view of the sealing bar sequentially pivoting drive mechanism;

FIG. 13 is similar to FIG. 12 but shows a sealing bar moved out of the position at which it applies pressure for sealing contact between the polymeric sheet and the mold;

FIG. 14 is a view taken along the line 14—14 of FIG. 12;

FIG. 15 is a view taken along the line 15—15 of FIG. 2;

FIG. 16 is a sectional view taken along the line 16—16 of FIG. 2;

FIG. 17 is a sectional view taken along the line 17—17 of FIG. 2 and shows the cooling water sprayers; and FIG. 18 is a view taken along the line 18—18 of FIG. 2 and shows the molded sheet edge trimming mechanism.

DETAILED DESCRIPTION OF THE DRAWINGS

To the extent it is practical and enhances clarity of the disclosure, the same numbers will be used to identify the same or similar elements in the various views of the drawings.

The apparatus illustrated in FIGS. 1 to 18 can be used to continuously vacuum therefrom three dimensional geometrical shapes, such as cup-like recesses, into an endless polymeric sheet, which can then be coiled into a biological treatment rotor, such as one having the structure disclosed in Thissen U.S. Pat. No. 4,115,268.

With reference to FIG. 1, base 10 has a control panel 11 mounted at one end for electrical apparatus such as switches, junction boxes, circuit breakers and the like forming part of the electrical system used to operate the apparatus. The electrical circuitry and equipment can be standard items and they can be employed in a manner within the skill of the art to operate the apparatus.

Extending vertically upwardly from, and mounted on, base 10 are two similar mold supporting spaced apart frameworks 12 (FIGS. 1 and 2). Each framework 12 has three supporting channel legs 20, 21 and 22 to which horizontal member 24 is joined. Member 24 extends to vertical column 26. The lower ends of slanted arms 28 and 29 are joined to member 24. Circular segment angle 32 extends upwards from one end of member 24 to the ends of arms 28 and 29 and then back down to member 24.

Axle or shaft 33 is rotatably positioned in bearing mounts 34 secured to the top of each horizontal member 24 (FIGS. 1, 2 and 9). Two spaced apart metal disks 36 are mounted on shaft 33. Eight spokes 38, joined to each disk 36, extend radially outwardly to cylindrical metal mold 40.

Metal mold 40 has a cylindrical inner metal plate 42 spaced apart from cylindrical outer metal plate 44. The outer surface of plate 44 constitutes a molding face and the inner surface of plate 44 constitutes a non-molding face. The two peripheral edges 43 (FIG. 9) of cylindrical plates 42 and 44 are joined together. Eight axially positioned solid walls 46 (FIGS. 7, 7A and 11) extend between the plates 42 and 44. Each solid wall 46 is located at a radial 45° angle from its two adjacent walls 46 so that the space between plates 42 and 44 is divided into eight separate vacuum chambers 48 (FIGS. 3, 5, 7, 7A, 9 and 16).

The mold outer plate 44 is thicker than the inner plate 42. Outer plate 44 is provided with adjacent parallel columns X of conical cavities 50 (FIGS. 7, 9, 16 and 17) having a central threaded hole 52. The cavities in adjoining rows Y (FIGS. 7 and 8) are positioned obliquely to one another so that the rows, perpendicular to the columns, contain cavities 50 from every other column.

An air hole or port 54 extends from the bottom of each cavity 50 through the remaining thickness of plate 44 into communication with vacuum chamber 48 (FIGS. 5 and 9). A removable metal insert 56 fits into each cavity 50. Each insert 56 has a peripheral ridge 58 which curves smoothly on each side to conical sections 60 and 62 of identical taper or slope. The conical section 62 is longer than conical section 60 so that reversing the insert permits molding cup-like elements of two different depths in a polymeric sheet. A machine screw 64 extends through each insert 56 into threaded hole 52 to secure the insert in place irrespective of which end of the insert is up. Each insert 56 fits loosely in a cavity 50 so that air can flow around it and through air hole 54.

The solid walls 46 serve to divide the outer metal shell 44 into a series of eight equally sized and shaped molding plates 66 (FIG. 1). A separate vacuum chamber 48 is beneath the non-molding surface of each molding plate 66. No cavities 50 are located in the area of the solid walls 46 so that there the axial surface 47 (FIG. 7) across the mold is maintained cylindrically smooth to facilitate making an air tight seal between it and a sheet of polymeric material as will be explained further hereinafter.

Slow rotation of mold 40 is effected by means of sprocket 70, on shaft 32, containing chain 72 which engages sprocket 74 on a shaft extending from gear reduction box 76 powered by motor driven mechanism 78 (FIGS. 2 and 10).

Vacuum line 80 (FIGS. 1, 2 and 10) joins member 82 containing a swivel joint in which pipe 84 rotates. Pipe 84 communicates axially with shaft 32 which is hollow and closed at the other end. Vacuum gauge 86 is mounted on member 82 to indicate the extent of the vacuum in the line. A vacuum manifold ring 88 is fixedly joined to shaft 32 and holes or ports in the shaft communicate with the ring interior so that the vacuum applied by line 80 is also developed inside of the ring.

Eight equally spaced apart vacuum tubes 90 extend from ring 88 to the mold 40 (FIG. 10). Each vacuum tube 90 contains a valve 92. One vacuum tube 90 communicates with each of the eight separate vacuum chambers 48. A vacuum can be separately developed for each of the eight molding plates 66 by opening the valve 92 in the tube 90 serving a molding plate 66.

Each valve 92 is fitted with a roller 94 (FIG. 15) mounted on a pivotal arm 96 which can push in valve stem 98 to open the valve. An angle track member 100, curved into a segment of a circle, is attached to four of the spokes 38. Angle track member 100 is adjustable by the mechanism 102 shown in FIG. 15, although other obvious adjusting means can be used, to adjust its distance from roller 94 so as to thereby vary the extent to which each valve opens and how long it stays open. The mold 40 rotates counter-clockwise when viewed as in FIG. 2 so that each valve 92 opens when, or soon after, it contacts member 100. The valve stays open until the roller 94 is no longer pushed inward enough by track member 100 to keep it open, even if the roller is adjacent the track, or until the roller 94 clears the lower end of the track 100. In this way, a vacuum can be applied to only one of the molding plates 66, or simultaneously to two or three such molding plates.

A heater 102 is stationarily mounted above an area of the cylindrical mold 40 cut by about a radial 135° angle. The heater 102 is mounted on a portion of the two spaced apart angle members 32. Heater 102 is shaped like a circular cylindrical section and is positioned a uniform distance away from mold 40 so as to achieve uniform heating of a polymeric sheet thereon to a plastic or softening condition. Heat 102 comprises a plurality of assemblies 104 placed side-by-side, with each assembly 104 made up of six side-by-side electrical resistance heating elements 101 (FIG. 5) which have a length slightly longer than the width of mold 40. Electric wires 107 run through channel cover 105 to elements 101. Radiation shields 103 are placed on the sides of the heaters. A heat shield is also placed on top of the heater.

The two edge portions 106 of cylindrical mold 40 are raised (FIGS. 5 and 9) above the mold surface area therebetween. A trough or groove 108 (FIG. 5) is cut in the raised edge portions 106 and vertical spaced apart pins 110 are positioned in the grooves to engage with chains 122. Sharp pointed vertical pins 114 are positioned on mold 40 between groove 108 and the outer edge of the mold. The pins 114 puncture the polymeric sheet 120 and prevent it from being pulled away from the mold edge during the molding operation.

A loop of bicycle chain 122, or similar chain, is mounted on each of two separate sets of rollers 124, 125, 126 and 127 so that a substantial run of each of the two chains lays in each of the grooves 108 and is engaged by pins 110. The rotation of mold 40 thereby causes the chains 122 to move with the mold even when a layer of polymeric sheet material 120 is between the bottom of the grooves 108 and the chain with, of course, the polymeric sheet material punctured by pins 110.

Roll 118 of unmolded smooth polymeric sheet material 120 is mounted on a shaft supported at each end by bearing mountings 130. The polymeric sheet material 120 travels from roll 118 around roller 132 which has a tapered rim 134 (FIG. 3) at each end to help position the sheet material 120 on the roller. In addition, the two outer end portions 136 of roller 132 are of enlarged diameter and contain a groove 138 into which the pins 114 project, thereby permitting the pins to puncture the sheet material 120 so as to hold it in place on mold 40 during subsequent heating and molding operations.

The shaft 142, on which roller 132 is mounted, is supported at its ends by bearing blocks 144 slidably mounted in frames 146 secured on beams 148 (FIGS. 3 and 4). Pressure is applied to blocks 144 by springs 150 mounted around adjusting bolts 152. In this way, the pressure applied to the polymeric sheet material can be varied, regardless of the sheet material thickness.

After the sheet material 120 leaves roller 132 it is pulled along on rotating mold 40 because of its perforation by pins 114. As the sheet material passes beneath heater 102 it is raised to a temperature sufficiently high to soften it to a moldable, plastic condition. Before the sheet material exits the heater 102, the two chains 122 force its softened edge portions into the two troughs 108, causing the pins 110 to perforate or puncture the sheet material 120 and engage with the chain links. By tightly holding the sheet material edge portions in the troughs 108, seals are obtained on such edges which are essentially air-tight.

Shortly after the heated sheet material emerges from the heater 102 it is pressed into sealing engagement with mold 40 along an area 47 (FIG. 7) free of inserts 56 located about at the adjoining ends of two molding plates 66 and axial to the shaft 32. FIGS. 10 to 14, taken in conjunction with FIGS. 1 and 2, illustrate a mechanism by which the sheet material 120 can be laterally pressed against the mold 40 along the area 47 in an air-tight seal.

With reference to FIGS. 10 and 11, hollow horizontal pipe 160 supports two opposing parallel hollow sealing bars 162 and 164 by means of spokes 166. Pipe 160 communicates at one end with water feed pipe 168 and at the other end with water discharge pipe 170. Water supplied and removed by such pipes serves to cool the sealing bars 162 and 164 to prevent them from sticking to the hot polymeric sheet material. The pipes 168 and 170 include fluid swivels, not shown, near the ends of pipe 160 so that it can freely rotate without leakage of water.

Each end of pipe 160 is mounted in a U-shaped bracket 172, connected to the curved or arced angle 32, which permits the pipe 160 to move up and down therein (FIGS. 12 to 14). An indexing mechanism 174 is mounted adjacent one end of pipe 160. The indexing mechanism 174 has a first pair of diametrically positioned arms 176 and a second pair of diametrically positioned arms 178. A branch finger 180 projects at an angle from each arm 178 (FIGS. 12 and 13). A roller 182 is adjustably mounted on mold 40, so as to engage each arm 176, near the junction of two adjoining molding plates 66, for a total of eight rollers 182.

To the rear of each roller 182 is a pair of spaced apart pins 184 and 186 (FIG. 13). As the mold 40 rotates, the pin 184 contacts arm 178 causing pipe 160 to rotate so long as such contact exists. This causes the closer of either press bar 162 or 164 to pivot toward the heated polymeric sheet on mold 40. Then pin 186 contacts finger 180 causing the press bar 162 (or 164 if it is closer) to move closer to the heated polymeric sheet material 120 covering the mold. As the mold 40 continues to rotate counter-clockwise, arm 176 is contacted by roller 182 and pivoted clockwise thereby forcing bar 162 against the polymeric sheet and pressing it against the mold. The rotating mold exerts a force against bar 162 (or 164) which is transmitted as a lifting force to pipe 160 until the bar 162 is radially aligned with pipe 160 and mold shaft 32. As further rotation of the mold occurs, pipe 160 descends until it reaches its lowest position. Pivoting of bar 162 continues as a result of the rotating action of the mold until bar 162 just clears the mold. At that point, arm 178 is in position to be contacted by pin 184 to rotate pipe 160 as described above. The described operation thus presses bar 162 into sealing engagement at the area 47 separating two molding plates 66, followed by a similar operation which presses bar 164 into sealing engagement at the area 47 between the next two adjoining molding plates 66. These sequential operations are then repeated continuously as molding of the sheet material progresses. This operation thus seals, simultaneously, the trailing edge of one molding plate 66 and the leading edge of the adjoining molding plate 66.

With reference to FIGS. 7 and 7A, the formation of a gas tight seal between the trailing edge of one molding plate 66 and the leading edge of the adjoining molding plate 66 can be facilitated by positioning a small metal tube 165 on the top trailing surface of each molding plate 66. The tube 165 is axially positioned with respect to the mold 40 and is parallel to axle 33. A series of spaced apart small holes 166 are located on the upper side of tube 165. One or more holes 167 communicate with the interior of tube 165 and vacuum chamber 48 so that a vacuum can be created in tube 165 and, by means of holes 166, a vacuum created beneath the softened sheet material 120. The sheet material 120 is thereby pressed by atmospheric pressure tightly against the tube to thereby facilitate creation of the desired seal.

When the molding apparatus is first put into operation, the smooth but softened polymeric sheet material 120 emerges from heater 102 with the edges sealed by means of the two chains 122 as described above. A first leading edge lateral seal is then created by means of a metal bar hand applied over the soft sheet material 120 to press it into contact with smooth area 47. The first trailing edge lateral seal is then created by means of tube 165 and either bar 162 or 164, depending on which bar happens to be properly positioned to make the seal in the area 47 between two molding plates 66. Immediately, or very soon thereafter, roller 94 engages angle member 100 causing valve 92 to open and a vacuum to be created in vacuum space 48. Simultaneously, this causes air to flow from beneath the polymeric sheet material through holes 54 into vacuum chamber 48 from which it is removed by vacuum tube 90. With the pressure reduced beneath softened polymeric sheet material 120, atmospheric pressure forces it downwardly until it presses against, and acquires the three dimensional contour of, the molding plate surface. This deforming and molding process takes place as the mold rotates continuously. Rotation of the mold continues without interruption and, in due course, another lateral seal is created, by means of tube 165 and either bar 162 or 164, at the next area 47 between two molding plates 66. Once that seal is developed, the sheet of softened polymeric material 120 is automatically sealed air-tight completely around the periphery of a molding plate 66 and no further hand-created seals are required. The next section of heated polymeric sheet material is similarly vacuum molded against the next molding plate 66 once it is automatically sealed around its periphery to the mold. Subsequent sections of the sheet material are similarly molded without interruption thus forming a molded strip 120A of indefinite length. During the molding operation, it is desirable to maintain the vacuum on a prior molded section while the immediately adjoining but subsequent section is being molded to help maintain the lateral air-tight seal between the two sections.

The molded polymeric sheet material 120A, desirably while still subjected to a vacuum, is cooled such as by three spray heads 190 supplied by hose 192 with cold water (FIGS. 1 and 17). The used water is collected in pan 194 and delivered to a suitable disposal means.

The described vacuum thermoforming operation produces a molded strip 120A having side edge portions which are undesirable for some uses so they are cut off by a trimmer apparatus 200 (FIGS. 2 and 18). Trimmer apparatus 200 includes a metal plate 202 which is pivotally mounted to channel member 204. The position of plate 202 is pivotally varied by means of wire rope 206 which extends from the plate to rotatable shaft 208 on which it can be wound, or unwound from it, by handle 209. Shaft 210, having pulley 212 thereon, is rotatably located in bearings mounted to the bottom of plate 202. Motor 214 drives a belt which communicates with pulley 212 to thereby rotate shaft 210. A sharp edged circular blade 216 is mounted near each end of shaft 210 to cut off a portion of each edge of the molded strip.

Proper positioning of the molded strip during the edge trimming operation is achieved by means of free wheeling roller 220 which has a ring-like flange 222 adjacent each end (FIG. 18). The flanges 222 are dimensioned and spaced apart so as to fit snugly between adjoining columns of inserts 56.

After the trimming operation, the molded and trimmed strip 120A is coiled around shaft 230 (FIG. 1) and stored until it is to be used, such as in constructing a rotating biological contactor. Of course, the product can be put to other uses.

The trimmed edge bands 234 (FIG. 1) are fed to a waste receiving chute 236 which delivers it to a chopper 238 from which the particles exit to salvage container 240 for reuse.

Although the apparatus described above employs a rigid cylindrical mold, it is also feasible to employ a mold formed by pivotally connecting together the adjoining ends of the molding plates 66 to thereby form an endless track or loop, much like the track of an earth moving tractor. A segmented vacuum track of this general type is illustrated in Larsen U.S. Pat. No. 3,987,925, together with a supporting framework for the track and a vacuum valving system.

The polymeric sheet material 120 used in the apparatus provided by this invention can be any thermoplastic material such as polystyrene, polyethylene or polypropylene.

The foregoing detailed description has been given for clearness of understanding only, and no unnecessary limitations should be understood therefrom, as modifications will be obvious to those skilled in the art.

What is claimed is:

1. Apparatus for continuously vacuum molding a plurality of three dimensional geometrical shapes in a roll of thermoplastic polymeric sheet material comprising:
   a cylindrical shell rotatably mounted on an axle and means to rotate the cylindrical shell;
   said cylindrical shell including a plurality of single curved molding plates, the outer molding faces of which have a plurality of three dimensional geometrical shapes;
   at least one air flow orifice extending through each molding plate so that air can be removed from the molding face of each molding plate;
   means to continuously feed a length of polymeric sheet material into position adjoining the outer molding faces of the cylindrical shell while it rotates;
   means to continuously heat moving polymeric sheet material to a thermoforming condition as the cylindrical shell rotates to thereby provide a heated sheet portion adjoining each consecutive molding plate;
   means to releasably seal the heated polymeric sheet to and all around the border of each consecutive molding plate including bar means to press heated polymeric material against at least the trailing edge of each molding plate in a line axial to the cylindrical shell to thereby seal that portion of the molding plate border against air intake;
   means to consecutively remove air, from between the heated polymeric sheet and the molding faces of consecutive molding plates, through the at least one air flow orifice whereby atmospheric pressure can force the heated sheet into the shape of the molding face surface; and
   means for continuously removing the molded sheet, after it cools to a non-plastic condition, from contact with the moving molding plate molding face.

2. Apparatus according to claim 1 in which:
   the sides of the cylindrical shell are parallel;
   each cylindrical shell edge has a row of spaced apart radial sharp pointed pins which can penetrate the polymeric sheet material;
   a pair of endless chains mounted on rollers positioned axial to, and spaced outwardly of, the drum, and with one of the chains being positioned opposite each row of pins so that a length of the chain follows the cylinder surface contour and engages the pins with a layer of the heated polymeric sheet material therebetween to provide a border seal against air entry along the edges.

3. Apparatus according to claim 2 in which each row of pins is located in a circular groove.

4. Apparatus according to claim 1 in which the bar means moves, and is in contact, with the polymeric sheet from before the air is removed from between the molding plate and the polymeric sheet material and until after the thermoforming is completed.

5. Apparatus according to claim 4 in which the bar means withdraws from contact with the molded sheet material while the air removal means remains activated.

6. Apparatus according to claim 1 in which the bar means is supported independently of the cylindrical shell and includes at least one bar connected to, and parallel with, a rotatable shaft which is vertically displaceable.

7. Apparatus according to claim 6 including means on the cylindrical shell to rotate the bar into pressing contact with the heated polymeric sheet.

8. Apparatus according to claim 1 including:
   a vacuum tube means along the trailing edge of each molding plate in a line axial to the cylindrical shell to reduce the pressure adjacent the tube so that softened polymeric material is pressed against the mold by atmospheric pressure.

9. Apparatus for continuously vacuum molding a plurality of three dimensional geometrical shapes in a roll of thermoplastic polymeric sheet material comprising:
   a cylindrical shell with parallel sides rotatably mounted on an axle and means to rotate the cylindrical shell;
   said cylindrical shell including a plurality of single curved molding plates, the outer molding faces of which have a plurality of three dimensional geometrical shapes;
   each cylindrical shell edge having a row of spaced apart radial sharp pointed pins which can penetrate the polymeric sheet material;
   at least one air flow orifice extending through each molding plate so that air can be removed from the molding face of each molding plate;
   means to continuously feed a length of polymeric sheet material into position adjoining the outer molding faces of the cylindrical shell while it rotates;

means to continuously heat moving polymeric sheet material to a thermoforming condition as the cylindrical shell rotates to thereby provide a heated sheet portion adjoining each consecutive molding plate;

means to releasably seal the heated polymeric sheet to and all around the border of each consecutive molding plate; and a pair of endless chains mounted on rollers positioned axial to, and spaced outwardly of, the drum, and with one of the chains being positioned opposite each row of pins so that a length of the chain follows the cylindrical shell surface contour and engages the pins with a layer of the heated polymeric sheet material therebetween to provide a border seal against air entry along the edges.

10. Apparatus according to claim 9 in which each row of pins is located in a circular groove.

* * * * *

UNITED STATES PATENT AND TRADEMARK OFFICE
CERTIFICATE OF CORRECTION

PATENT NO. : 4,284,396

DATED : August 18, 1981

INVENTOR(S) : Christopher P. Thissen et al

It is certified that error appears in the above-identified patent and that said Letters Patent are hereby corrected as shown below:

Column 4, line 35, change "therefrom" to --thermoform--;

column 6, line 16, change "Heat" to --Heater--.

Signed and Sealed this

Seventeenth Day of November 1981

[SEAL]

Attest:

GERALD J. MOSSINGHOFF

Attesting Officer

Commissioner of Patents and Trademarks